(12) United States Patent  
Saito

(10) Patent No.: US 8,749,631 B2  
(45) Date of Patent: Jun. 10, 2014

(54) VEHICLE DETECTING SYSTEM

(75) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 501 days.

(21) Appl. No.: 12/356,994

(22) Filed: Jan. 21, 2009

(65) Prior Publication Data

US 2009/0184845 A1 Jul. 23, 2009

(30) Foreign Application Priority Data

Jan. 22, 2008 (JP) ................................. 2008-011467

(51) Int. Cl.  
*H04N 7/18* (2006.01)

(52) U.S. Cl.  
USPC .......................................... 348/148; 348/143

(58) Field of Classification Search  
USPC ................................................. 348/143, 148  
See application file for complete search history.

(56) References Cited

U.S. PATENT DOCUMENTS

| | | | | |
|---|---|---|---|---|
| 5,650,944 A * | 7/1997 | Kise | .............................. | 700/304 |
| 6,053,268 A * | 4/2000 | Yamada | ........................ | 180/167 |
| 6,259,359 B1 * | 7/2001 | Fujinami et al. | .............. | 340/435 |
| 6,502,031 B2 * | 12/2002 | Uehara | ......................... | 701/207 |
| 7,362,883 B2 * | 4/2008 | Otsuka et al. | ................. | 382/104 |
| 2005/0117802 A1 * | 6/2005 | Yonaha et al. | ................ | 382/173 |

FOREIGN PATENT DOCUMENTS

| | | |
|---|---|---|
| JP | 05-114099 | 5/1993 |
| JP | 05-265547 | 10/1993 |
| JP | 06-266828 | 9/1994 |
| JP | 10-283461 | 10/1998 |
| JP | 10-283477 | 10/1998 |
| JP | 2006-072495 | 3/2006 |
| JP | 2006-140636 | 6/2006 |

* cited by examiner

*Primary Examiner* — Umar Cheema  
(74) *Attorney, Agent, or Firm* — Smith, Gambrell & Russell, LLP

(57) ABSTRACT

A vehicle detecting system includes image taking means for taking an image of the surroundings of a subject vehicle, vehicle detecting means for detecting a vehicle from the taken image, and lateral-position detecting means for detecting a lateral position of the vehicle in the taken image. The lateral-position detecting means vertically divides, into a plurality of sections, a region set in a portion of the taken image in which an image of the vehicle is included or is presumed to be included. The lateral-position detecting means calculates average brightnesses of pixels belonging to pixel columns vertically extending in the sections and having a width corresponding to one pixel or a plurality of number of pixels. The lateral-position detecting means calculates differences in average brightness between pixel columns adjacent in a lateral direction, and detects the lateral position of the vehicle on the basis of absolute values of the differences.

21 Claims, 13 Drawing Sheets

VEHICLE DETECTING SYSTEM

CROSS-REFERENCES TO RELATED APPLICATIONS

The disclosure of Japanese Patent Application No. 2008-011467 filed on Jan. 22, 2008 including the specification, drawings and abstract is incorporated herein by reference in its entirety.

BACKGROUND OF THE INVENTION

1. Field of the Invention

The present invention relates to vehicle detecting systems, and more particularly, to a vehicle detecting system including an image taking means that takes images for detecting at least a vehicle.

2. Description of the Related Art

In recent years, techniques of detecting objects existing around a vehicle, such as a car, by analyzing an image taken by an image taking means, such as a charge coupled device (CCD) camera, or analyzing reflected waves of radio waves emitted from a radar apparatus, have been developed (for example, see Japanese Unexamined Patent Application Publication No. 2006-140636). These techniques are applied to safe driving technologies for vehicles. For safe driving, for example, the probability of a collision with a detected object is judged, an alarm is given to alert the driver, and automatic steering and automatic brake control are exerted in order to avoid the collision.

In this object detection, it is important to accurately detect the positions of other vehicles, particularly, a preceding vehicle. It is also important to accurately detect not only the distance in the front-rear direction between a subject vehicle and a preceding vehicle, but also the position of the preceding vehicle in the lateral direction (hereinafter referred to as a lateral position) in order to judge the probability of a contact or a collision with an object.

In this respect, the above-described detection technique using the radar apparatus can, in general, accurately obtain the distance in the front-rear direction, but cannot easily increase the accuracy in detecting the lateral position. In contrast, the above-described image analysis of a taken image provides a high accuracy in detecting the lateral position because of the capability of accurately detecting the shape of the vehicle. However, since the image is taken in pixels, the accuracy of data on the distance from the subject vehicle particularly to a remote vehicle sometimes decreases.

In order to utilize the advantages of the detection techniques using the radar apparatus and image analysis of the taken image and to overcome the disadvantages of the techniques, the above-described publication proposes a detection system using a radar and image analysis in combination. In this detection system, a rough position of, for example, a preceding vehicle is detected as a region to be processed by the radar, multiple histograms are calculated by detecting edges in the region by an image taking means, and the lateral position of the preceding vehicle are detected by following the preceding vehicle with reference to the stored histograms.

Unfortunately, in the above-described detection system, it is necessary to calculate multiple histograms and to store large amounts of data. Moreover, since it is necessary to extract values that have time continuity from the data, much time is taken for processing, in other words, processing becomes slow.

Once a wrong position is stored, it is not necessarily easy to correct the position to a right position. When the brightness pattern of a preceding vehicle or the like changes with time and place, stability of the processing result is not necessarily ensured effectively.

It is conceivable to estimate the lateral position of the preceding vehicle on the basis of only histograms to which lateral edges of the preceding vehicle are added, without checking against the stored data. However, for example, when the preceding vehicle runs past an object whose edges are dense, such as the bush, more edges exist in the bush than in the preceding vehicle, and therefore, it is difficult to accurately detect lateral ends of the preceding vehicle.

SUMMARY OF THE INVENTION

The present invention has been made in view of these circumstances, and an object of the invention is to provide a vehicle detecting system that can accurately detect a lateral position of a vehicle, such as a preceding vehicle, from a taken image by a relatively easy processing.

In order to overcome the above-described problems, a vehicle detecting system according to an aspect of the present invention includes image taking means for taking an image of the surroundings of a subject vehicle; vehicle detecting means for detecting a vehicle from the taken image; and lateral-position detecting means for detecting a lateral position of the detected vehicle in the taken image. The lateral-position detecting means vertically divides, into a plurality of sections, a region set in a portion of the taken image in which an image of the vehicle is included or is presumed to be included. The lateral-position detecting means calculates average brightnesses of pixels belonging to pixel columns vertically extending in the sections and having a width corresponding to one pixel or a plurality of number of pixels. The lateral-position detecting means calculates differences between the average brightnesses of the pixel columns and average brightnesses of adjacent pixel columns adjacent in a lateral direction, and detects the lateral position of the vehicle on the basis of absolute values of the differences.

In this case, a region is set in a portion of the taken image in which an image of the vehicle, such as a preceding vehicle, is included or is presumed to be included, and the region is vertically divided into a plurality of sections. The averages of brightnesses (hereinafter referred to as average brightnesses) of pixels is calculated for the pixel columns in the sections. Differences from the average brightnesses of adjacent pixel columns are calculated, and the lateral position of the vehicle is detected on the basis of the absolute values of the differences.

For this reason, calculations necessary to detect the lateral position are only addition, averaging (division), subtraction, and acquisition of the absolute value. Therefore, the lateral position of the preceding vehicle or the like can be accurately detected from the taken image with a simpler calculation than in the method using multiple histograms.

For example, in the bush, multiple images of leaves and their shadows are taken. For this reason, when the lateral edge strength is calculated for each pixel, multiple edges are detected in the image of the bush, and this makes it difficult to distinguish between the bush and the vehicle. However, when the average brightness of the pixels is calculated for each pixel column extending in the vertical direction, as in the aspect of the present invention, brightnesses and darkness of the leaves and shadows are made uniform in each pixel column. Moreover, since the overall brightness of the bush does not change so much even when the pixel column shifts, the average brightnesses of the pixel columns are substantially equal, and no pixel column whose average brightness greatly changes appears.

In contrast, when the average brightness of pixels is calculated for each pixel column extending in the vertical direction in portions corresponding to pillars of the vehicle (see FIG. 12A that will be described below) and portions hidden by the vehicle body below the bumper (see FIG. 12C), the average brightness greatly changes in these portions, and the difference in the lateral direction greatly changes.

For this reason, by calculating the average brightness of the pixels in each pixel column extending in the vertical direction and calculating the difference of the average brightness in the lateral direction so as to find a pixel column in which the difference greatly changes, it can be determined that a pixel column in which the average brightness greatly changes is a lateral position of the vehicle. Further, it is possible to clearly distinguish between the bush and the vehicle, and to accurately detect the lateral position of the vehicle, such as a preceding vehicle, from the taken image.

Preferably, the lateral-position detecting means detects the lateral position of the vehicle on the basis of the sum of the absolute values of the differences of pixel columns in the sections that have the same lateral coordinate in the taken image.

In this case, since the lateral position of the vehicle is detected on the basis of the sum of absolute values of differences of pixel columns in the sections that have the same lateral coordinate in the taken image, the average brightnesses of the pixel columns detected independently in the sections can be treated together. Moreover, since the average brightnesses of the pixel columns change at the right and left end portions of the vehicle in each section, the end portions are emphasized and easily detected by adding the absolute values of the differences of the average brightnesses. Consequently, the lateral position of the vehicle can be accurately detected from the taken image, and the above-described advantages of the present invention can be achieved more reliably.

Preferably, the lateral-position detecting means detects, as the lateral position of the vehicle, a position of a pixel column that provides the highest peak value, of peak values in the sum of the absolute values of the differences calculated for the sections or the sum of the absolute values of the differences of pixel columns in the sections that have the same lateral coordinate in the taken image, the peaks exceeding a predetermined threshold value, a position of a pixel column having a peak value detected closest to a previously detected lateral position of the vehicle, or a position of a pixel column having a peak value detected farthest from a center position of the vehicle.

In this case, the lateral position of the vehicle is detected on the basis of the absolute values of the differences in the sections or the sum of the absolute values of the differences. Since it is thereby possible to clearly grasp the lateral position of the vehicle and to accurately detect the lateral position of the vehicle from the taken image, the above-described advantages of the present invention can be achieved more reliably.

Preferably, the lateral-position detecting means vertically divides the region into at least a lower section serving as an image portion in which a portion of the vehicle hidden by a body of the vehicle is presumed to be included, and the other section.

In the lower section, a portion hidden by a tire below the bumper or the vehicle body, such as a lower chassis, is darker than the surroundings, and the brightnesses of pixels in the hidden portion are clearly lower than those in the surroundings. Therefore, it is possible to clearly distinguish the hidden portion and the surroundings by obtaining the differences in the average brightness between the pixel columns.

Since the average value of the brightnesses of the pixels belonging to each pixel column extending in the vertical direction of the sections are calculated in the present invention, if the region is improperly divided, the darkness of the hidden portion that can be clearly distinguished from the surroundings is balanced with the brightness in the upper part of the vehicle body. In this case, it may be impossible to clearly distinguish between the hidden portion and the surroundings.

For this reason, when the region is divided, a lower section is provided in at least the hidden portion so as to distinguish from the other portion of the vehicle. Consequently, it is possible to clearly distinguish between the hidden portion and the surroundings, and to accurately detect the lateral position of the vehicle. As a result, the above-described advantages of the present invention can be achieved more reliably.

Preferably, the lateral-position detecting means vertically divides the region into at least a lower section serving as an image portion in which a portion of the vehicle hidden by a body of the vehicle is presumed to be included, an upper section serving as an image portion in which an image of a window glass is presumed to be included, and the other section.

In a case in which the vehicle is a car having a window glass (e.g., a rear glass or a front glass) in the upper part thereof, if an upper section is provided in an image portion that is presumed to include an image of the window glass, bright images of pillars are provided between the dark window glass and the surroundings. Therefore, the pillars are sometimes clearly detected by obtaining differences in the average brightness between the pixel columns.

For this reason, when the region is divided, not only the lower section is provided, but also the upper section is provided at the window glass in the upper part of the vehicle. This allows the lateral position of the vehicle to be clearly detected, and the above-described advantages of the present invention can be achieved more reliably.

Preferably, the lateral-position detecting means divides the region into the lower section and the other section, or into the lower section, the upper section, and the other section, on the basis of a vertical proportion and the number of sections preset in accordance with a shape of the vehicle detected currently or previously.

In this case, when the region is divided into the lower section and the other section, or into the lower section, the upper section, and the other section, the proportion for division in the vertical direction is set beforehand. This allows the lower section and so on to be set at proper positions, and the above-described advantages of the present invention can be achieved reliably.

While a window glass is provided in the upper part of the vehicle in the taken image when the vehicle is a car, it is not provided when the vehicle is a truck or a dump truck, as viewed from the rear surface of the vehicle. From the shape of the vehicle detected currently or previously, it can be specified to some extent, whether or not the vehicle is a car or a truck.

For this reason, when the number of sections is preset in accordance with the shape of the vehicle and division is performed on the basis of the number, the lower section and so on can be set at proper positions, and the region can be divided properly. As a result, the above-described advantages of the present invention can be achieved reliably.

Preferably, when dividing the region into the sections, the lateral-position detecting means determines a vertical proportion for dividing the region and the number of sections obtained by division, on the basis of a distribution of brightnesses of pixels belonging to a pixel column extending in the vertical direction of the region and having a width equal to one pixel or a predetermined number of pixels.

In this case, a distribution of brightnesses of pixels in a pixel column extending from the upper end to the lower end of the region is detected, and the vertical proportion for dividing the region and the number of sections are determined as follows: A pixel portion in the lower part of the pixel column which has a low brightness and in which a portion of the vehicle hidden by a tire or a vehicle body, such as a lower chassis, below the bumper is presumed to be included is set as a lower section. A pixel portion in the upper part of the pixel column which has a low brightness and in which an image of a window glass is presumed to be included is set as an upper section. The other portion is set as the other section.

This makes it possible to accurately detect the lateral position of the vehicle on the basis of the absolute values of differences in the average brightness in the sections. For this reason, the lateral position of the vehicle, such as a preceding vehicle, can be more accurately and more reliably detected from the taken image, and the above-described advantages of the present invention can be achieved more reliably.

Preferably, the lateral-position detecting means adopts right and left lateral positions of the vehicle detected by the lateral-position detecting means or right and left lateral positions of the vehicle detected by the vehicle detecting means or a sensor. The adopted positions provide a lateral width of the vehicle that is closer to a previously detected lateral width of the vehicle.

In this case, of the right and left lateral positions of the vehicle detected by the lateral-position detecting means and the right and left lateral positions of the vehicle detected by the vehicle detecting means or a sensor, the lateral positions which provide a lateral width closer to the previously detected lateral width of the vehicle are adopted. Hence, the right and left lateral positions of the vehicle corresponding to the actual lateral width of the vehicle can be detected, and the above-described advantages of the present invention can be achieved more reliably.

BRIEF DESCRIPTION OF THE DRAWINGS

FIG. 3 shows a distance image calculated on the basis of the reference image shown in FIG. 2 and so on;

DESCRIPTION OF THE PREFERRED EMBODIMENTS

A vehicle detecting system according to an embodiment of the present invention will be described below with reference to the drawings.

While stereo images are taken by two cameras serving as an image taking means 2 in this embodiment, for example, the image taking means 2 can be formed by a single camera or three or more cameras. Further, the structure of a vehicle detecting means 11, which will be described below, is not limited to a structure adopted in the embodiment as long as the vehicle detecting means 11 can detect a vehicle, such as a preceding vehicle, from a taken image.

Figure 1:
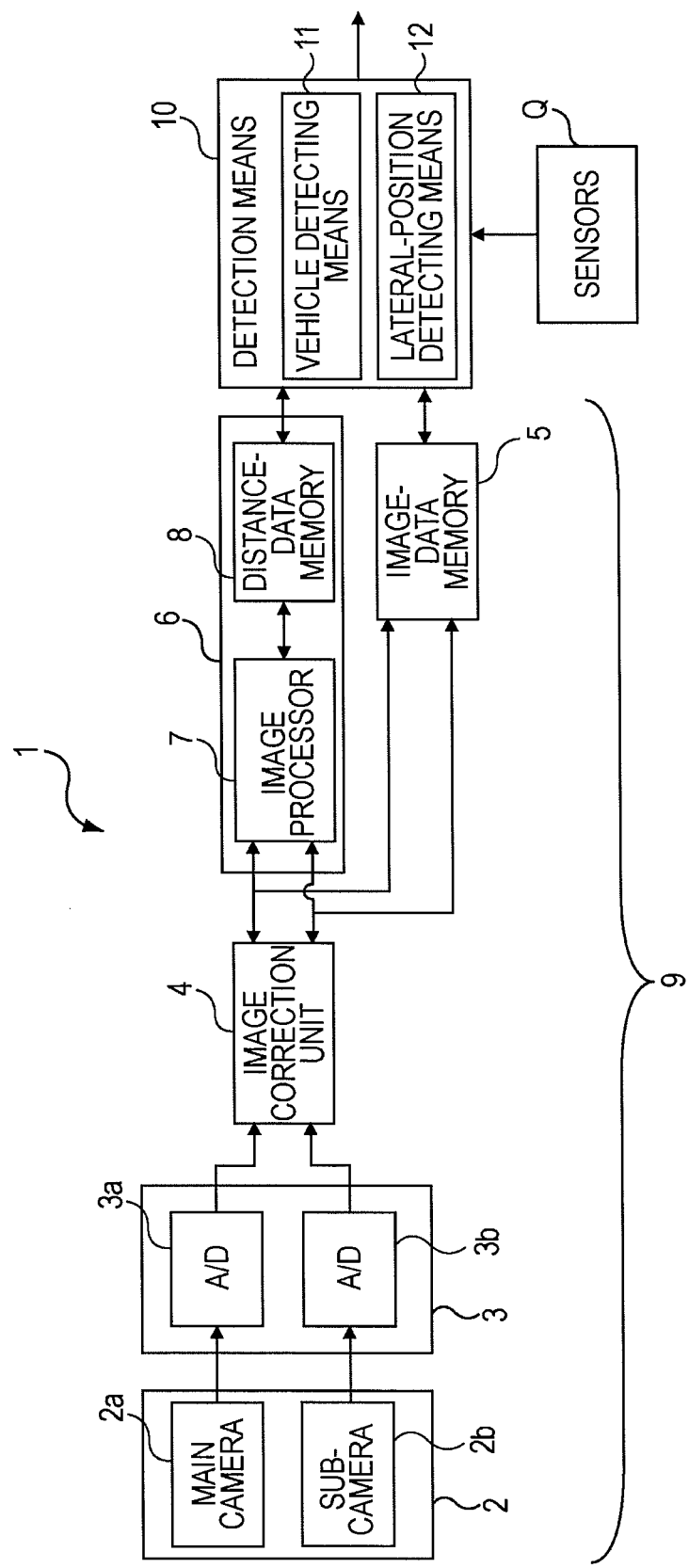
FIG. 1 is a block diagram showing a configuration of a vehicle detecting system according to an embodiment.

Referring to FIG. 1, a vehicle detecting system 1 according to the embodiment mainly includes a positional-information collecting means 9 and a detection means 10. The positional-information collecting means 9 includes an image taking means 2, a conversion means 3, and an image processing means 6, etc., and the detecting means 10 includes a vehicle detecting means 11 and a lateral-position detecting means 12.

The positional-information collecting means 9 includes the image taking means 2 for taking images of surroundings of a subject vehicle. The positional-information collecting means 9 takes images of objects around the subject vehicle, and collects information about the positions of the objects in real space, including the distances from the subject vehicle to the objects.

In this embodiment, the positional-information collecting means 9 is based on the vehicle detecting system and so on disclosed in Japanese Unexamined Patent Application Publication Nos. 5-114099, 5-265547, 6-266828, 10-283461, 10-283477, and 2006-72495 filed earlier by the present applicant. The positional-information collecting means 9 will briefly described below.

In the positional-information collecting means 9, as shown in FIG. 1, a pair of images of the surroundings of a subject vehicle are taken by the image taking means 2 including a main camera 2a and a sub-camera 2b formed by CCD cameras. The main camera 2a and the sub-camera 2b are spaced a fixed distance apart in the vehicle width direction. The taken images are converted into digital images by A/D converters 3a and 3b provided in the conversion means 3, and are subjected to image correction, such as removal of displacement and noise and correction of the brightness, by an image correction unit 4. The corrected digital images are stored in an image-data memory 5 and are transmitted to the detection means 10.

Figure 2:
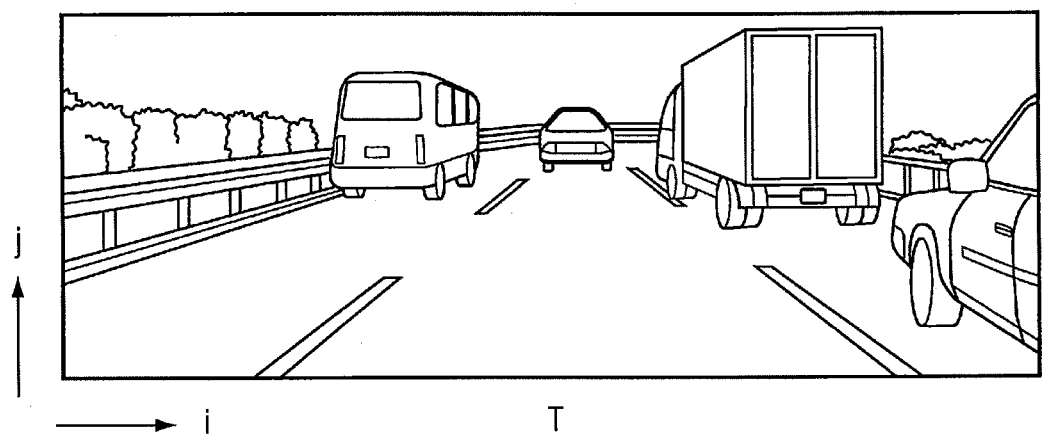
FIG. 2 shows an example of a reference image.

After image correction, the taken images are also transmitted to the image processing means 6. By an image processor 7, an image taken by the main camera 2a, as shown in FIG. 2 (hereinafter referred to as a reference image T) is divided into a plurality of pixel blocks. Correspondingly to the pixel blocks, pixel blocks of an image taken by the sub-camera 2a are found by stereo matching, and a parallax is calculated for each pixel block. Calculation of the parallax has been described in detail in the above-described publications.

Figure 3:
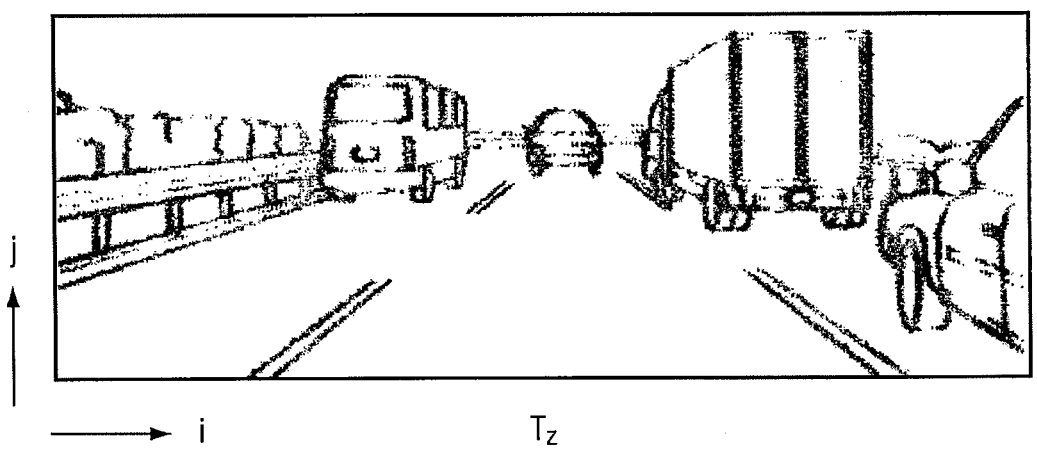

The parallax can be correlated with the position in real space according to the principle of triangulation. 10. Hereinafter, an image formed by the pixel blocks with the assigned parallaxes dp in the reference image T will be referred to as a distance image Tz. The distance image Tz is image-like data in which the parallaxes dp are respectively assigned to the pixel blocks, as shown in FIG. 3.

The method for collecting positional information about objects is not limited to a specific method. Besides the method adopted in this embodiment, for example, the distance Z between the subject vehicle and the preceding vehicle can be measured with a radar apparatus in which the distance Z to an object is measured on the basis of information about reflected light of laser light or infrared light applied to the front of the subject vehicle.

As shown in FIG. 1, the detection means 10 includes the vehicle detecting means 11, and the lateral-position detecting means 12. The detection means 10 also includes a memory (not shown). Necessary data are input from sensors Q to the means in the detection means 10.

The vehicle detecting means 11 detects objects from the reference image T taken by the image taking means 2, and detects a vehicle, such as a preceding vehicle, from the detected objects. In this embodiment, the vehicle detecting means 11 thus functions as an object detecting means for detecting objects existing around the subject vehicle from the reference image T. Information about a vehicle, such as a preceding vehicle, and objects detected by the vehicle detecting means 11 is output from the vehicle detecting system 1 so as to be utilized in other apparatuses.

In this embodiment, an operation of the vehicle detecting means 11 for detecting objects from the reference image T is based on the vehicle surroundings monitoring apparatuses and so on disclosed in the above-described publications. The operation will be briefly described below.

In the object detecting operation, the vehicle detecting means 11 divides a distance image Tz shown in FIG. 3 into vertical strip sections each having a predetermined width. The vehicle detecting means 11 forms a histogram relating to parallaxes dp provided above the road surface, of parallaxes included in each section, and sets the mode of the histogram as a parallax dp of the section. This operation is performed for all sections. While only objects existing above the road surface are thus detected in this embodiment, it is possible to simultaneously or separately detect markings on the road surface such as lane lines.

Figure 4:
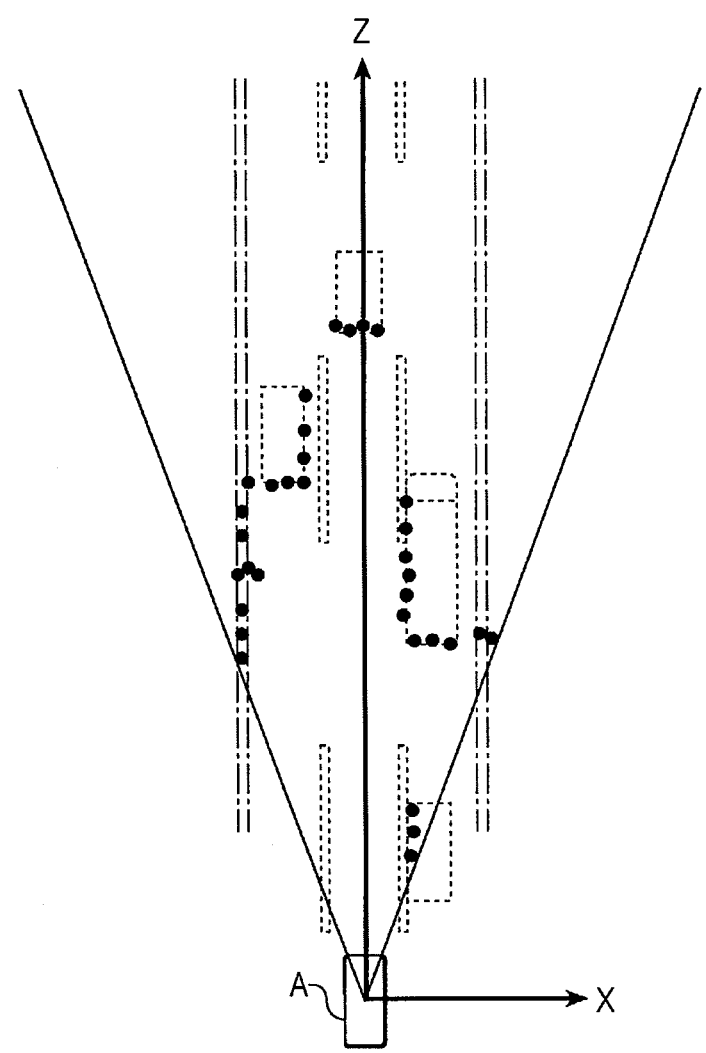
FIG. 4 is a view formed by plotting distances of objects in sections into real space.

Then, the vehicle detecting means 11 calculates the coordinates (X, Y, Z) of objects in real space on the basis of the parallaxes dp of the sections according to the above Expressions (1) to (3). When the calculated coordinates of the objects are plotted in real space, they are plotted as dots with some variations in portions of forward objects facing a subject vehicle A, as shown in FIG. 4.

Figure 5:
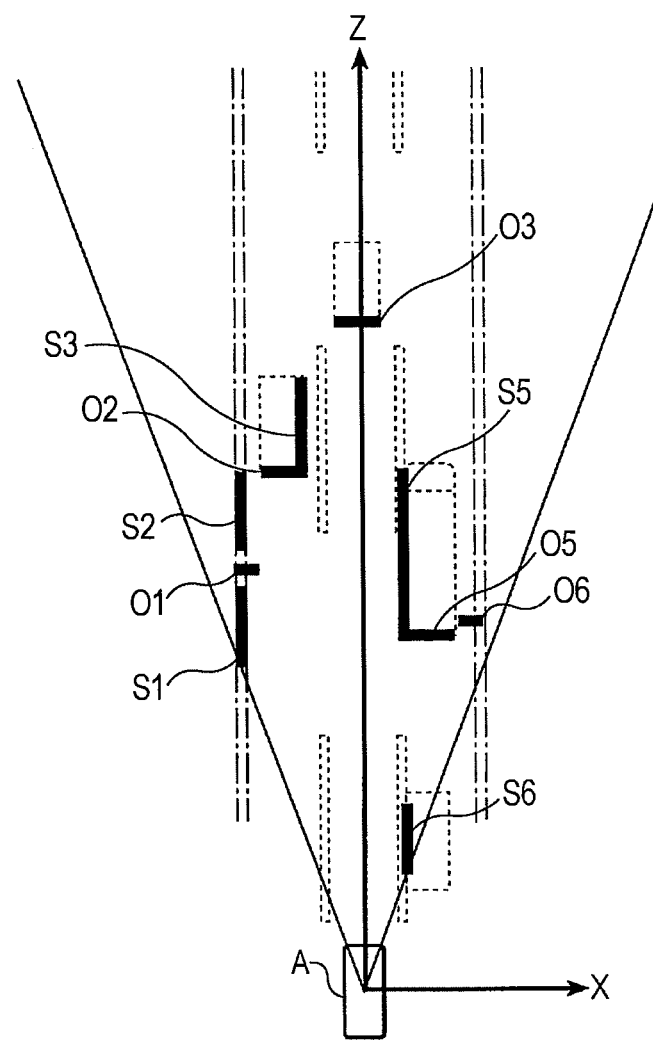
FIG. 5 shows objects obtained by linear approximation of dots shown in FIG. 4.

The vehicle detecting means 11 searches for the distances from the plotted dots to the adjacent dots in the X- and Z-axis directions in real space and the total length in the X-axis direction between the leftmost dot to the rightmost dot in a group into which the dots are classified. Then, the vehicle detecting means 11 classifies dots having values within set threshold ranges into groups, and subjects the dots in the groups to linear approximation so as to detect objects, as shown in FIG. 5.

Figure 6:
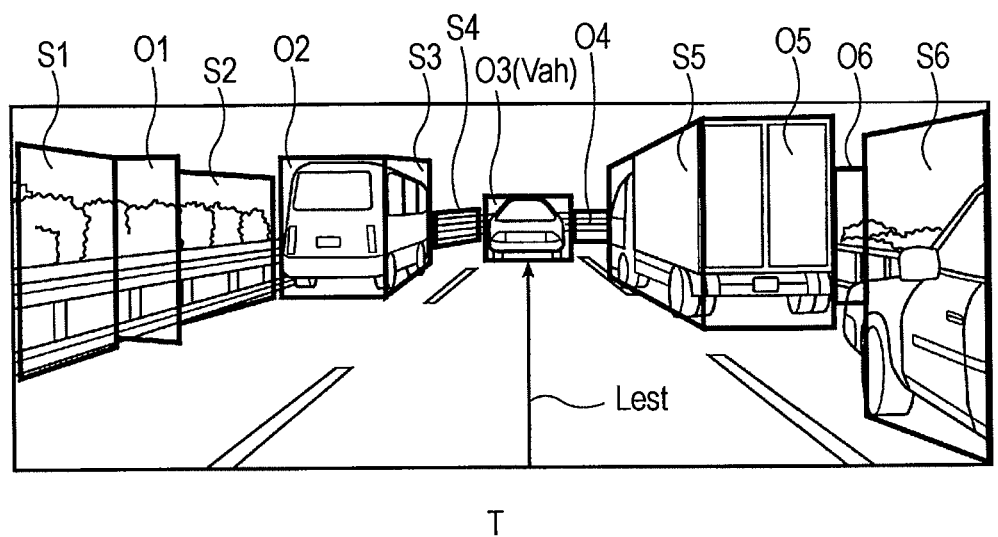
FIG. 6 shows objects and a preceding vehicle that are detected and enclosed by frames in the reference image.

In this embodiment, the objects thus detected by the vehicle detecting means 11 are enclosed by rectangular frames in the reference image T, as shown in FIG. 6. In FIGS. 5 and 6, labels O and S represent the types of faces of the objects facing the subject vehicle A. Label O shows that a rear face of an object is detected, and label S shows that a side face of the object is detected.

Subsequently, in vehicle detection, the vehicle detecting means 11 calculates the speeds in real space from information about the distances Z of the detected objects, determines whether the objects are vehicles, and thereby detects vehicles from the detected objects.

Figure 7:
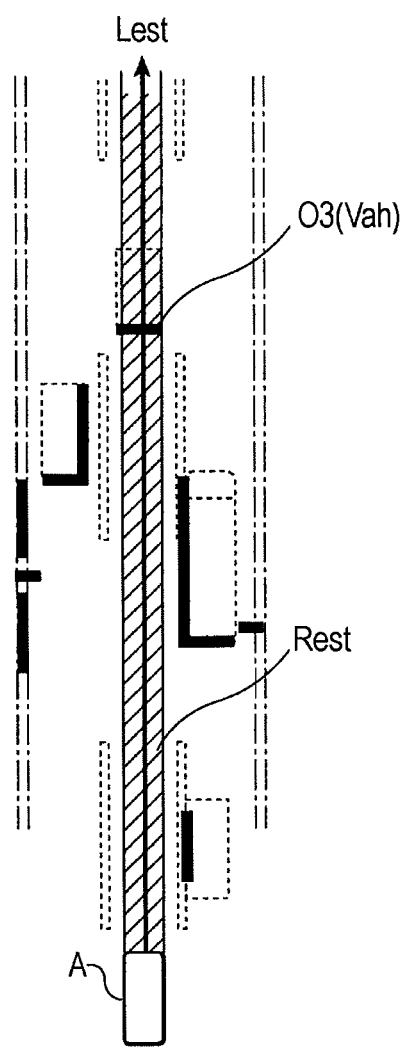
FIG. 7 shows a traveling locus and a traveling path of a subject vehicle, and a preceding vehicle in real space.

In preceding-vehicle detection, the vehicle detecting means 11 first estimates, as a traveling locus Lest, a locus that the subject vehicle A will form during future driving, on the basis of the behavior of the subject vehicle A, as shown in FIG. 7. Then, the vehicle detecting means 11 calculates, as a traveling path Rest of the subject vehicle A, a region that has a width equal to the width of the subject vehicle A and that includes the traveling locus Lest at the center thereof.

The traveling locus Lest of the subject vehicle A can be calculated from the turning curvature Cua of the subject vehicle A. The turning curvature Cua is calculated according to the following Expression (4) or the following Expressions (5) and (6) on the basis of the vehicle speed V of the subject vehicle A, the yaw rate γ, the steering angle δ of the steering wheel, etc:

$$Cua = \gamma/V \quad (4)$$

$$Re = (1 + Asf \cdot V^2) \cdot (Lwb/\delta) \quad (5)$$

$$Cua = 1/Re \quad (6)$$

where Re represents the turning radius, Asf represents the stability factor of the vehicle, and Lwb represents the wheel base.

The vehicle detecting means 11 detects, as a preceding vehicle traveling in front of the subject vehicle A, a vehicle closest to the subject vehicle A, of the vehicles existing on the traveling path Rest of the subject vehicle A. For example, a vehicle O3 is detected as a preceding vehicle Vah in FIGS. 6 and 7.

In this embodiment, the vehicle detecting means 11 pursues the preceding vehicle with consistency by calculating the probability that the preceding vehicle detected in the previous sampling period and the vehicle detected as the preceding vehicle in the current sampling period are the same three-dimensional object. Further, the vehicle detecting means 11 can detect the exchange between preceding vehicles, for example, when a detected preceding vehicle comes out of the front of the subject vehicle A and a vehicle in front of the detected preceding vehicle becomes a new preceding vehicle, or when another vehicle cuts in between the subject vehicle A and the preceding vehicle so as to become a new preceding vehicle.

When a preceding vehicle is not detected in the current sampling period, the vehicle detecting means 11 estimates the position of a preceding vehicle in the current sampling period on the basis of the position and speed in real space of the preceding vehicle detected in the previous sampling period, and then continues pursuing the preceding vehicle.

The vehicle detecting means 11 stores, in the memory, information about the coordinates of the right and left lateral positions in real space of the objects, vehicles, and preceding vehicle detected, as described above. As for at least the preceding vehicle Vah, the vehicle detecting means 11 calculates the lateral width of the preceding vehicle Vah from the coordinates of the right and left lateral positions in real space, and stores the lateral width, in the memory, as a lateral width Wtznew detected on the basis of the distance image Tz in the current detection. Lateral widths of other objects and vehicles can also be calculated. As described above, information about the objects and vehicles, including the preceding vehicle Vah, is output as necessary.

Separately from the right and left lateral positions and lateral widths Wtznew of the vehicles and the preceding vehicle Vah detected by the vehicle detecting means 11, as described above, the lateral-position detecting means 11 detects right and left lateral positions and lateral widths of the vehicles and the preceding vehicle Vah on the basis of the brightnesses of pixels in the reference image T.

While lateral positions of vehicles other than the preceding vehicle Vah are detected, as necessary, a description will be given below of a case in which lateral positions and lateral width of the preceding vehicle Vah are detected. Hereinafter, a lateral width of the preceding vehicle Vah detected by the lateral-position detecting means 12 will be referred to as a lateral width Wtnew, since the lateral width is detected on the basis of the reference image T.

Figure 8:
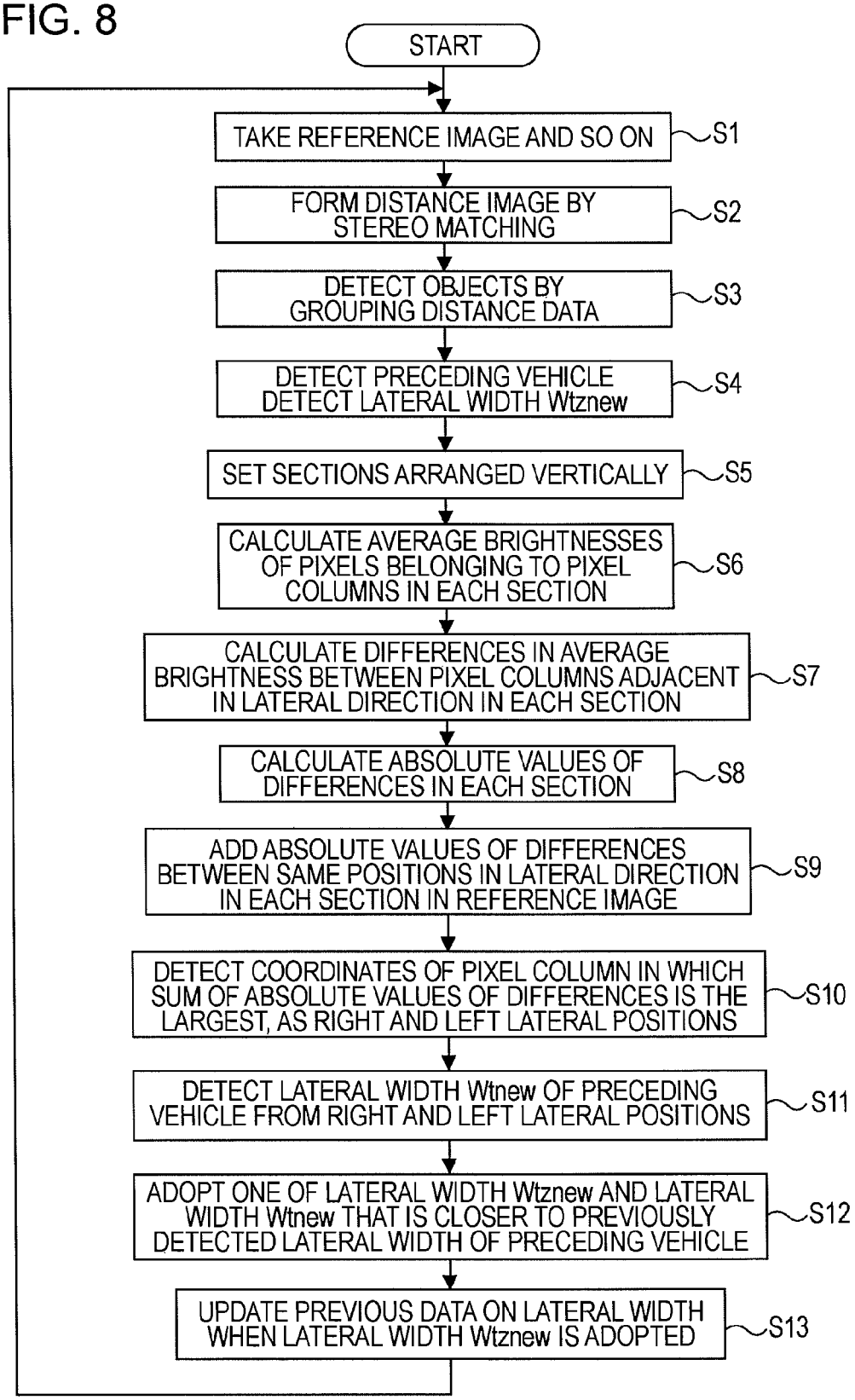
FIG. 8 is a flowchart explaining a procedure performed by the vehicle detecting system of the embodiment.

The vehicle detecting system 1 including the lateral-position detecting means 12 performs a procedure according to a flowchart shown in FIG. 8. The control by the lateral-position detecting means 12 will be described below with reference to the flowchart shown in FIG. 8. In addition, the operation of the vehicle detecting system 1 in the embodiment will be described.

In the vehicle detection system 1, a pair of images of the surroundings of the subject vehicle A, including a reference image T, are first taken by the image taking means 2 including the main camera 2a and the sub-camera 2b in the positional-information collecting means 9, as described above (Step S1). The taken images are subjected to stereo matching by the image processor 7 in the image processing means 6, thus forming a distance image Tz (Step S2).

Objects are detected by grouping distance data with the vehicle detecting means 11 of the detection means 10 (Step S3), and vehicles and a preceding vehicle Vah are detected from the detected objects. A lateral width Wtznew of the preceding vehicle Vah is detected on the basis of the distance image Tz, and is stored in the memory (Step S4).

Subsequently, the lateral-position detecting means 12 detects right and left lateral positions and lateral widths Wtnew of the vehicles and the preceding vehicle Vah in the reference image T on the basis of the brightnesses of the pixels in the reference image T.

Figure 9:
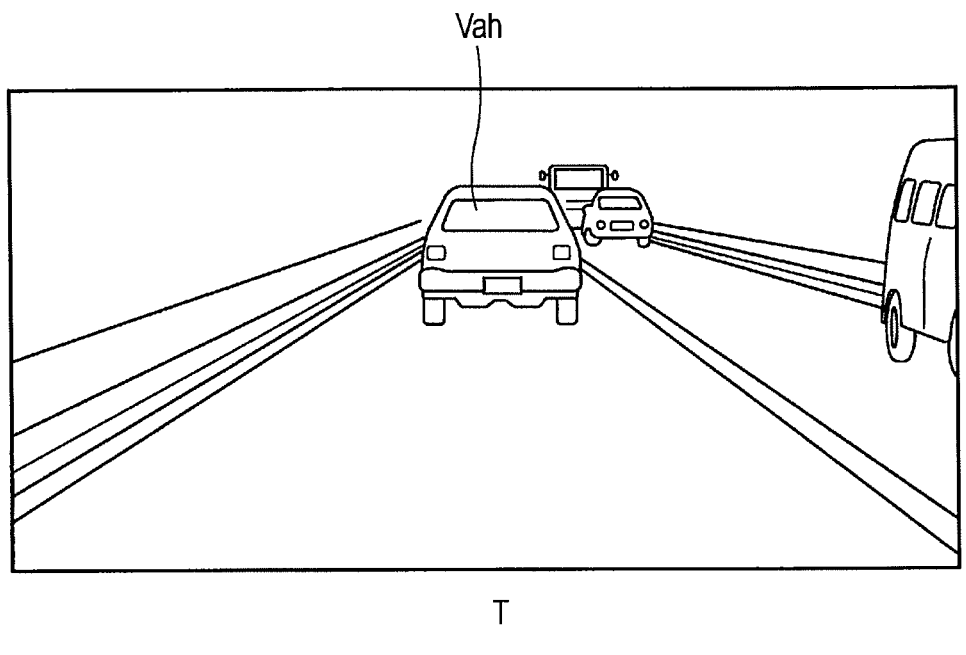
FIG. 9 shows an example of a reference image.
Figure 10:
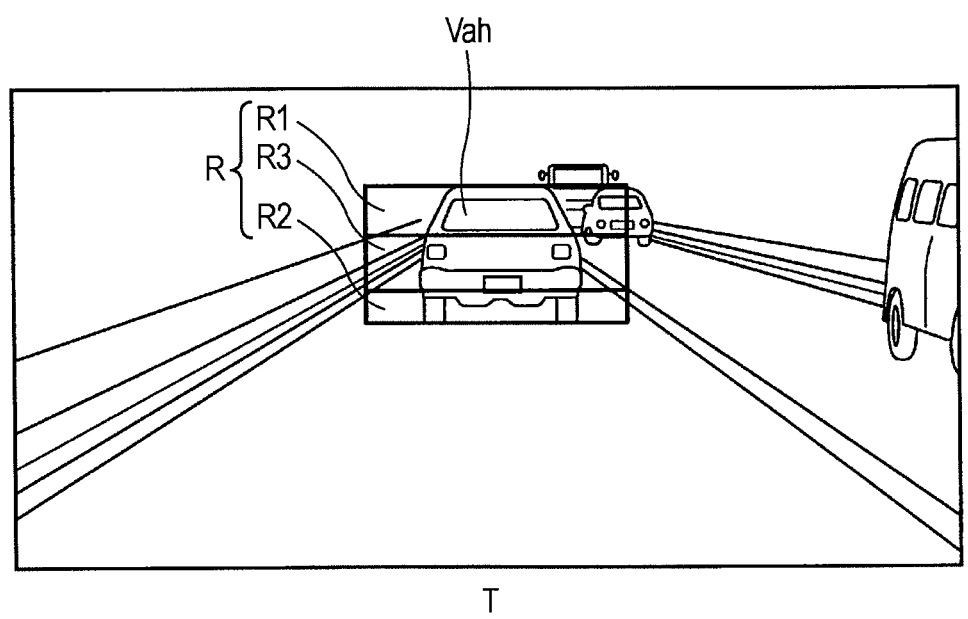
FIG. 10 explains a region and divisions set in the reference image shown in FIG. 9.

For example, in a reference image T shown in FIG. 9, the lateral-position detecting means 12 first sets a region R shown in FIG. 10 at a portion of the reference image T in which an image of the preceding vehicle Vah is included or is presumed to be included (Step S5 in FIG. 8). The region R is set as a region that includes the preceding vehicle Vah and that extends from the preceding vehicle Vah to the right and left.

The region R can be set by extending a frame (see FIG. 6) surrounding the preceding vehicle Vah, which is detected in the reference image T in the current sampling period, to the right and left by a predetermined number of pixels in the reference image T. However, it is sometimes impossible to detect a preceding vehicle Vah in the current sampling period, as described above. For this reason, in this embodiment, the region R in the current sampling period is set on the basis of the position in real space of the preceding vehicle Vah detected in the previous sampling period.

More specifically, the lateral-position detecting means 12 sets a frame at an image portion of the reference image T where an image of the preceding vehicle Vah is presumed to be taken in the current sampling period, on the basis of the position in real space of the preceding vehicle Vah detected in the previous sampling period, the relative speed between the subject vehicle and the preceding vehicle Vah, and the yaw rate of the subject vehicle. Then, the lateral-position detecting means 12 extends the frame to the right and left by a predetermined number of pixels in the reference image T so as to set a region R.

In this embodiment, the region R is vertically divided into three sections, namely, an upper section R1, a lower section R2, and the other section R3 (hereinafter referred to as a middle section R3), as shown in FIG. 10.

In the present invention, the term "vertically divide" means that the upper section R1, the lower section R2, and the middle section R3 extending in the horizontal direction are arranged in a manner such as to be adjacent in the vertical direction, as shown in FIG. 10.

Of the sections, the lower section R2 is set at an image portion that is presumed to include a portion of a rear surface of the preceding vehicle Vah that is hidden by tires under a bumper or a vehicle body such as a bottom chassis.

The upper section R1 is set at an image portion that is presumed to include an image of the rear glass of the preceding vehicle Vah. When the vehicle is an oncoming vehicle, the upper section R1 is set at an image portion that is presumed to include an image of the front glass of the oncoming vehicle. The middle section R3 is set at an image portion between the upper section R1 and the lower section R2 that is presumed to include images of taillights, a bumper, and a registration plate of the preceding vehicle Vah.

The lateral-position detecting means 12 sets the region R, and sets the upper section R1, the lower section R2, and the middle section R3 by dividing the vertical length of the region R on the basis of a preset proportion.

In this embodiment, this proportion does not depend on the type of the preceding vehicle Vah, for example, whether the preceding vehicle Vah is a sedan, a coupe, or a minivan, or whether the preceding vehicle Vah is a truck, a dump truck, or a bus. However, the proportion of division of the region R can be set beforehand in accordance with the type of the preceding vehicle Vah that is determined on the basis of the shape and size detected from the distance Z from the subject vehicle and the lateral width of the preceding vehicle Vah.

When it is judged, from the shape of the preceding vehicle Vah, that the preceding vehicle Vah is a truck or a dump truck, an image of the window glass (rear glass) is not taken, and the lower section R2 occupies a relatively high share. Therefore, instead of being divided in three, as in this embodiment, the region R can be divided into two sections, namely, an upper section R1 and a lower section R2.

Figure 11:
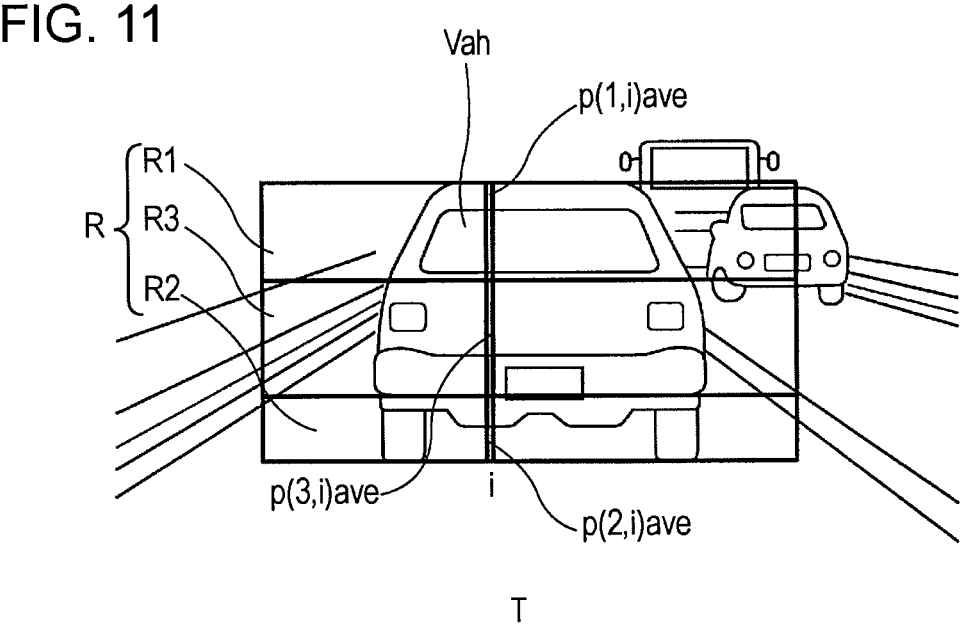
FIG. 11 explains pixel columns extending in the vertical direction of the divisions, and the average brightnesses of the pixel columns.

After the lateral-position detecting means 12 sets the region R and the upper section R1, the lower section R2, and the middle section R3, it calculates the average value p(n,i) ave of brightnesses p (average brightness) of pixels belonging to a pixel column having a width equal to the width of one pixel and extending in the vertical direction of each section Rn (n=1, 2, 3), as shown in FIG. 11 (Step S6 in FIG. 8). Here, i represents the i-coordinate of each pixel column in the reference image T.

In other words, for example, the sum of brightnesses p of all pixels belonging to one pixel column extending in the vertical direction in the upper section R1 shown in FIG. 11 is divided by the number of pixels in the pixel column, thus calculating the average brightness p(1, i)ave. Then, the pixel column is shifted to the right by one pixel, and the average brightness p(1, i+1)ave of the next pixel column is calculated. While shifting the pixel column in this way, the average brightness p(1,i)ave of each pixel column is calculated.

Similarly, the average brightnesses p(2,i)ave and p(3,i)ave of the lower section R2 and the middle section R3 are calculated. The average brightness of pixels can also be calculated for each pixel column having a predetermined width larger than the width of one pixel and extending in the vertical direction in the section Rn.

Figure 12A:
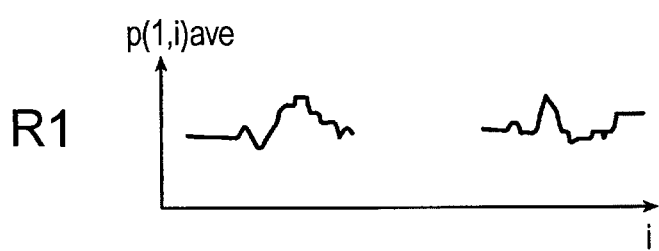
FIG. 12A is a graph showing the average brightness of an upper division in FIG. 11.
Figure 12B:
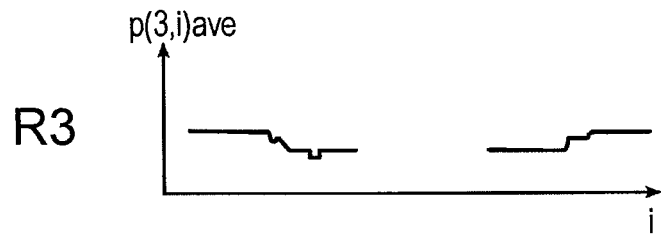
FIG. 12B is a graph showing the average brightness of a middle division.
Figure 12C:
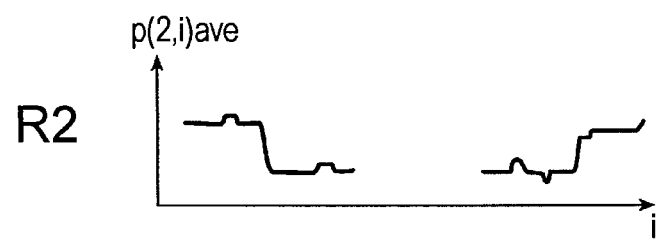
FIG. 12C is a graph showing the average brightness of a lower division.

FIGS. 12A, 12B, and 12C respectively show the average brightnesses p(n,i)ave calculated for the sections Rn of the region R shown in FIG. 11, as described above. In FIGS. 12A, 12B, and 12C, the average brightness p(n,i)ave calculated for each section Rn is shown partly.

In the upper section R1 shown in FIG. 12A, images of pillars provided beside the rear glass of the preceding vehicle Vah are white and bright, and the average brightnesses p(1,i)ave of the image portions corresponding to the pillars are higher than values of the other portions. In the middle section R3 shown in FIG. 12B, an image portion corresponding to the back surface of the preceding vehicle Vah is dark, and the average brightness p(3,i)ave thereof is slightly lower than the values of the other portions.

In the lower section R2 shown in FIG. 12C, images of portions hidden by the tires under the bumper and the vehicle body, such as the bottom chassis, of the preceding vehicle Vah are dark, and the average brightnesses p(2,i)ave of the corresponding image portions are lower than the values of the other portions. In this way, at least the lower section R2 is characterized in that images of the portions hidden by the body of the vehicle are darker than the other portions, and the average brightnesses p(2,i)ave of the portions are extremely lower than the values of the other portions.

Subsequently, the lateral-position detecting means 12 calculates a difference Δp(n,i) between the average brightness p(n,i)ave of each pixel column and the average brightness p(n,i−1) of a pixel column adjacent in the lateral direction in each section Rn (Step S7 in FIG. 8). The difference Δp(n,i) between the average brightnesses p(n,i)ave of the adjacent pixel columns corresponds to a so-called lateral edge strength of the reference image T.

Figure 13A:
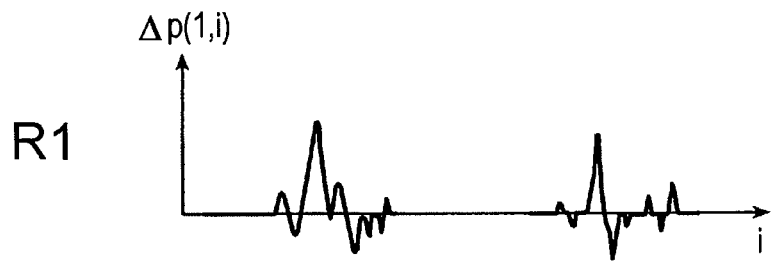
FIG. 13A is a graph showing a difference in the average brightness of the upper division in FIG. 11.
Figure 13B:
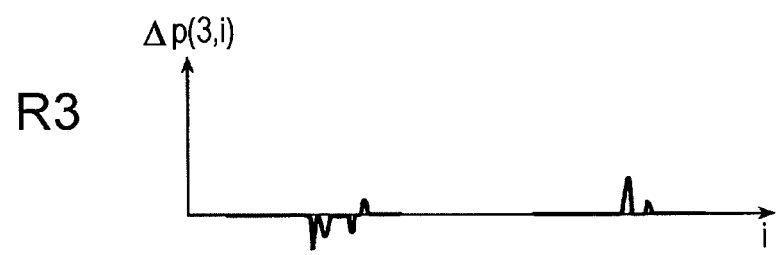
FIG. 13B is a graph showing a difference in the average brightness of the middle division.
Figure 13C:
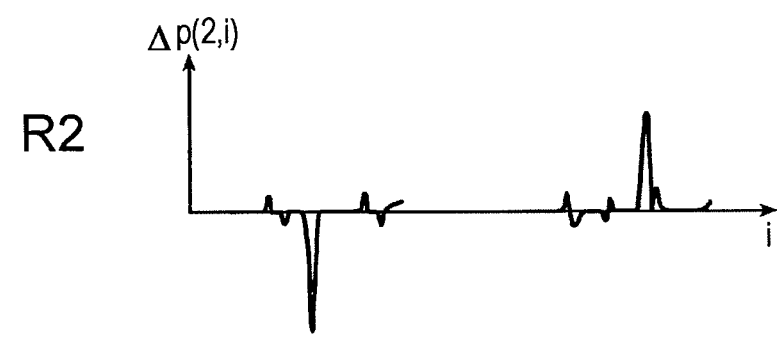
FIG. 13C is a graph showing a difference in the average brightness of the lower division.

More specifically, when the differences Δp(n,i) between the average brightnesses p(n,i)ave of pixel columns shown in FIGS. 12A, 12B, and 12C and the average brightnesses p(n, i−1) of the adjacent pixel columns are calculated in each section Rn, as shown in FIGS. 13A, 13B, and 13C.

Next, the lateral-position detecting means 12 calculates the absolute values of the differences Δp(n,i) thus calculated for each section Rn (Step S8 in FIG. 8). In this embodiment, the lateral-position detecting means 12 adds the absolute values of the differences Δp(n,i) of the pixel columns in the sections Rn having the same lateral i-coordinate in the reference image T according to the following Expression (7) (Step S9), and thereby calculates an additional value ΔP(i):

$$\Delta P(i) = |\Delta p(1,i)| + |\Delta p(2,i)| + |\Delta p(3,i)| \quad (7)$$

Figure 14A:
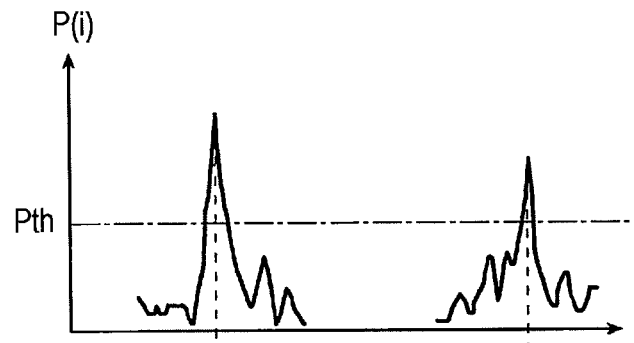
FIG. 14A is a graph showing the sum of absolute values of differences in FIGS. 13A to 13C, and FIG. 14B explains right and left lateral positions of a detected preceding vehicle.
Figure 14B:
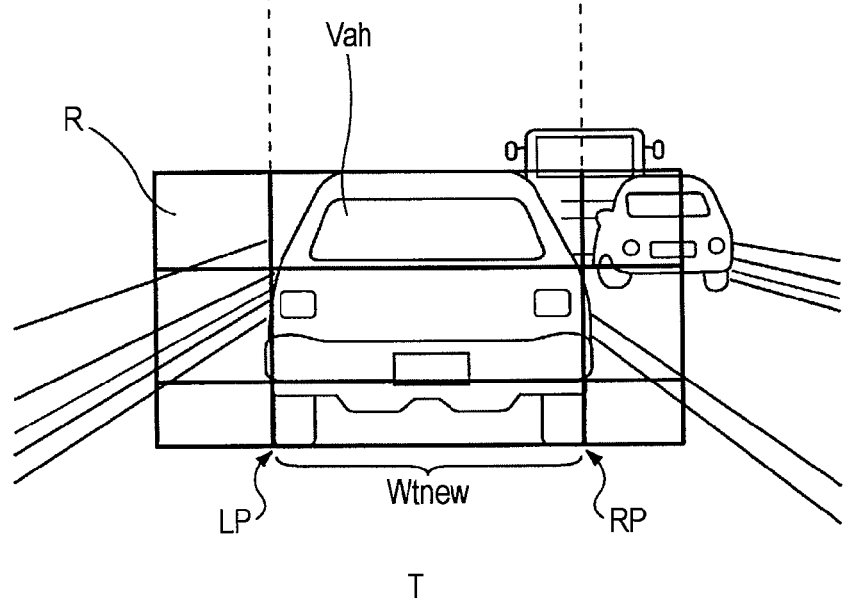

For example, an additional value ΔP(i) of the absolute values shown in FIG. 14A can be obtained from the differences Δp(n,i) of the sections Rn shown in FIGS. 13A, 13B, and 13C. In this embodiment, the lateral-position detecting means 12 detects, as a left lateral position LP and a right lateral position RP of the preceding vehicle Vah, the positions of pixel columns having the highest peaks, that is, the lateral i-coordinates in the reference image T, from the peak values of the additional values ΔP(i) of the absolute values of the differences Δp(n,i) higher than a predetermined threshold value Pth, as shown in FIG. 14B (Step S10 in FIG. 8).

Then, the lateral-position detecting means 12 calculates a lateral width Wtnew of the preceding vehicle Vah on the basis of the i-coordinates of the right and left lateral positions RP and LP of the preceding vehicle Vah detected in the reference image T and the distance Z from the subject vehicle to the preceding vehicle Vah according to Expressions (1) and (3) described above (Step S11), and stores the lateral width Wtnew in the memory. In this way, the lateral-position detecting means 12 detects the lateral width Wtnew of the preceding vehicle Vah in the reference image T from the brightnesses p of the pixels belonging to the region R.

Subsequently, the lateral-position detecting means 12 compares the detected lateral width Wtnew of the preceding vehicle Vah with the lateral width Wtznew detected by the vehicle detecting means 11 on the basis of the distance image Tz, as described above, and adopts one of the lateral widths closer to the previously detected lateral width of the preceding vehicle (Step S12). Lateral positions corresponding to the adopted lateral width are adopted as lateral positions of the preceding vehicle Vah detected in the current sampling period.

For example, when the positional-information collecting means 9 in the vehicle detecting system 1 is formed by a radar apparatus, the accuracy in detecting the lateral positions of the detected objects, such as the preceding vehicle Vah, is not necessarily high, as described above.

In this case, when the lateral-position detecting means 12 compares the lateral width Wtznew of the preceding vehicle Vah detected by the vehicle detecting means 11 on the basis of information obtained by the radar apparatus with the lateral width Wtnew of the preceding vehicle Vah detected from the brightnesses p of the pixels belonging to the region R of the reference image T including the preceding vehicle Vah, the latter lateral width Wtnew that is closer to the previously detected lateral width is adopted. This makes it possible to detect the lateral width of the preceding vehicle Vah closer to reality, and to accurately detect and pursue the preceding vehicle Vah.

In contrast, the distance Z from the subject vehicle to the object can be accurately calculated from the distance image Tz obtained by stereo matching based on a plurality of images (reference image T and so on) that are taken by the image taking means 2 having a plurality of cameras, as in the positional-information collecting means 9 of the vehicle detecting system 1 in this embodiment.

Figure 15A:
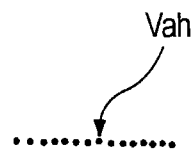
FIG. 15A is a plot view based on parallaxes in a normal case.

Further, the lateral width Wtznew of the preceding vehicle Vah can be accurately detected on the basis of the distances Z plotted in real space according to the parallaxes dp, as shown in FIG. 15A. For this reason, in normal cases, it is not always highly necessary to compare the lateral width Wtznew with the lateral width Wtnew obtained from the reference image T as in the above.

Figure 15B:
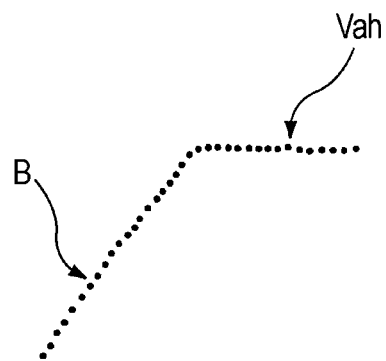
FIG. 15B is a plot view based on parallaxes provided when the preceding vehicle is detected integrally with a hedge.
Figure 16:
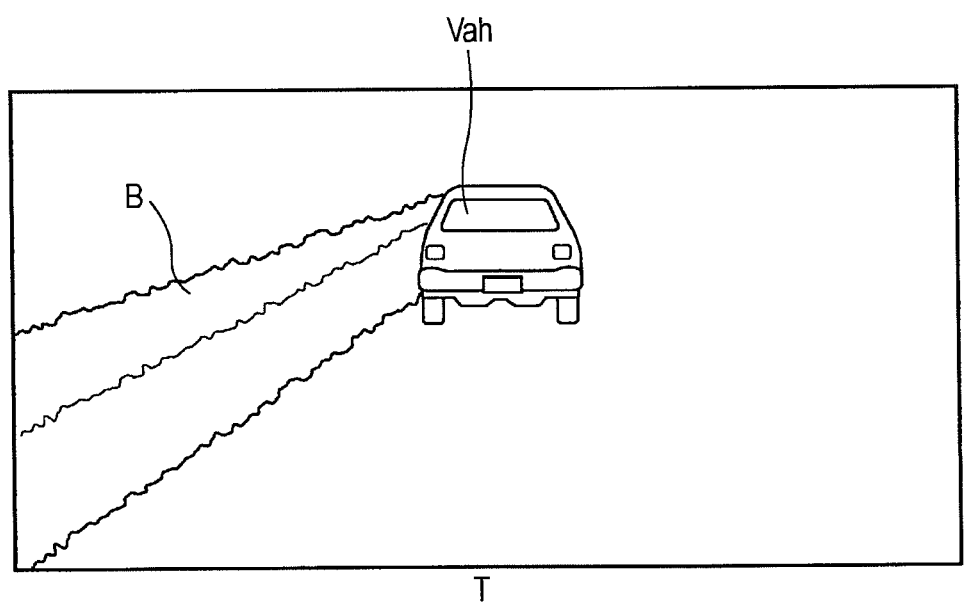
FIG. 16 shows an example of a taken reference image in which the preceding vehicle and the hedge are close to each other.

However, in a case in which the preceding vehicle Vah is adjacent to another object, for example, when the preceding vehicle Vah and a hedge B are very close to each other, as shown in FIG. 16, or when the preceding vehicle Vah travels past a utility pole, the preceding vehicle Vah, which has been properly detected, as shown in FIG. 15A, is sometimes detected as one object combined with the hedge B in the current sampling period, as shown in FIG. 15B. In this case, the lateral width Wtznew of the preceding vehicle Vah is detected as if it increased suddenly and greatly.

In this case, when the lateral width Wtnew of the preceding vehicle obtained from the additional values P(i) of the absolute values of differences Δp(n,i), as described above, is compared with the lateral width Wtznew of the preceding vehicle Vah and one of the lateral widths closer to the previously detected lateral width is adopted, even if the preceding vehicle Vah is detected in combination with another object as if the lateral width Wtznew of the preceding vehicle Vah suddenly and greatly increased, as shown in FIG. 15B, the lateral width Wtnew based on the reference image T is adopted properly. Further, the right and left lateral positions RP and LP of the preceding vehicle Vah detected in the reference image T on the basis of the lateral width Wtnew are adopted. This allows the preceding vehicle Vah to be accurately detected and pursued.

In this embodiment, since the lateral width Wtznew of the preceding vehicle Vah can be accurately detected by the vehicle detecting means 11 on the basis of the distance image Tz, as described above, when the lateral width Wtznew is adopted as the lateral width of the preceding vehicle Vah, data on the lateral width W of the preceding vehicle Vah stored in the memory is updated to the currently detected lateral width Wtznew (Step S13 in FIG. 8). When the lateral width Wtnew is adopted as the lateral width of the preceding vehicle Vah, data on the lateral width W of the preceding vehicle Vah is not updated.

After the operations in Steps S1 to S13 are completed, the vehicle detecting system 1 repeats these operations in every sampling period.

As described above, according to the vehicle detecting system 1 of this embodiment, a region R is set at an image portion of a taken image (reference image T) in which an image of a vehicle, such as a preceding vehicle Vah, is included or is presumed to be included. The region R is vertically divided into a plurality of sections Rn, and average brightnesses p(n,i)ave of pixels belonging to the pixel columns in the sections Rn are calculated. Differences Δp(n,i) from the average brightnesses p(n,i−1)ave of the adjacent pixel columns are calculated, and the lateral positions of the vehicle are detected on the basis of the absolute values of the differences Δp(n,i).

For this reason, calculations necessary to detect the lateral positions are only addition, averaging (division), subtraction, and acquisition of the absolute value. The lateral positions of the preceding vehicle or the like can be accurately detected from the taken image with a simpler calculation than in, for example, the above-described method using multiple histograms disclosed in Japanese Unexamined Patent Application Publication No. 2006-140636.

For example, in the hedge B shown in FIG. 16 or the bush, multiple images of leaves and their shadows are taken. For this reason, if the lateral edge strength is calculated for each pixel, multiple edges are detected in the hedge B or the bush, and this makes it difficult to distinguish between the hedge B or the like and the vehicle. However, when the average brightness p(n,i)ave of the pixels is calculated for each pixel column extending in the vertical direction (see FIG. 11), as in this embodiment, brightnesses and darkness of the leaves and shadows are made uniform in each pixel column.

Since the overall brightness of the hedge B or the like does not change so much even when the pixel column shifts, when the average brightnesses p(n,i)ave of the pixel columns are graphed, as shown in FIG. 12, the average brightnesses p(n,i)ave are substantially equal in the image portions of the hedge B or the like, and no pixel column whose average brightness p(n,i)ave greatly changes appears. In other words, there is no great change in the lateral edge strength serving as the difference between the average brightnesses p(n,i)ave of the pixel columns.

In contrast, when the average brightness p(n,i)ave of the pixels calculated for each pixel column extending in the vertical direction (see FIG. 11) greatly changes in the portions corresponding to the pillars of the vehicle (see FIG. 12A) and the portions hidden by the vehicle body below the bumper (see FIG. 12C), and the lateral edge strength greatly changes.

For this reason, by calculating the average brightnesses p(n,i)ave of the pixels in the pixel columns extending in the vertical direction and calculating the lateral edge strengths so as to find pixel columns in which the lateral edge strength greatly changes, it can be determined that the pixel columns in which the average brightness p(n,i)ave greatly changes are lateral positions of the vehicle. Further, it is possible to clearly distinguish between the hedge B and the vehicle, which is difficult when the detection is based on the distance image Tz, as shown in FIG. 15B, and it is also possible to accurately detect the lateral positions of the vehicle, such as the preceding vehicle, from the taken image.

In this embodiment, the absolute values of the differences Δp(1,i), Δp(2,i), and Δp(3,i) calculated for the upper section R1, the lower section R2, and the middle section R3 are obtained, and the positions of the pixel columns in which the peak of the additional value ΔP(i) of the absolute values is the highest are detected as right and left lateral positions of the vehicle.

Alternatively, for example, the positions of pixel columns having the peak values closest to the lateral positions of the vehicle detected in the previous sampling period can be detected as right and left lateral positions of the vehicle, or the positions of pixel columns having the peak values farthest from the center of the vehicle can be detected as right and left lateral positions of the vehicle.

Instead of calculating the additional value ΔP(i) of the absolute values of the differences Δp(n,i) calculated for the section Rn, attention can be focused on the peak values themselves of the differences Δp(n,i) of the sections Rn. That is, the positions of pixel columns having the highest peak values, of the peak values exceeding a predetermined threshold value, the positions of pixel columns having the peak values detected closest to the lateral positions of the vehicle detected in the previous sampling period, or the positions of pixel columns having the peak values detected farthest from the center position of the vehicle can be detected as lateral positions of the vehicle.

Figure 17:
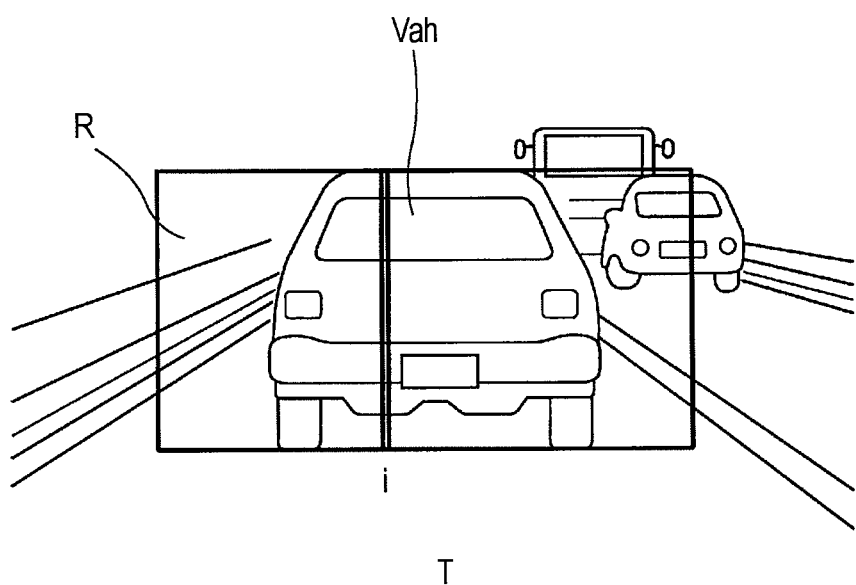
FIG. 17 shows a pixel column extending in the vertical direction set in a region according to a modification of a vehicle detecting system.

While the region R is divided into the sections Rn so that the length of the region R is divided according to the preset proportion in this embodiment, for example, pixel columns having a width corresponding to one pixel or a predetermined number of pixels and extending in the vertical direction are set in the region R at the time when the region R is set, as shown in FIG. 17, and distributions of brightnesses p of pixels belonging to the pixel columns are detected.

On the basis of the distribution of the brightnesses p, the proportion of vertical division of the region R or the number n of sections Rn can be determined so that a lower section R2 is a lower portion of the pixel column which has low brightness p and in which portions hidden by the tires under the bumper of the vehicle or the vehicle body, such as the bottom chassis, is presumed to be included, so that an upper section R1 is an upper portion of the pixel column which has a low brightness p and in which an image of the window glass (rear glass, front glass) is presumed to be included, as in a car or a minivan, and so that the other portion is set as a middle section R3.

In this case, the lateral positions of the vehicle can be accurately detected on the basis of the absolute values of the differences Δp(n,i) of the average brightnesses p(n,i)ave calculated for the pixel columns in the sections Rn. This allows the lateral positions of the vehicle, such as the preceding vehicle, to be more accurately and more reliably detected from the taken image.

What is claimed is:

1. A vehicle detecting system comprising:
   image taking means for taking an image of the surroundings of a subject vehicle;
   vehicle detecting means for detecting a vehicle from the taken image; and
   lateral-position detecting means for detecting a lateral position of the detected vehicle in the taken image,
   wherein the lateral-position detecting means vertically divides, into a plurality of sections, a region set in a portion of the taken image in which an image of the vehicle is included or is presumed to be included, and
   wherein the plurality of sections formed within the region are positioned in a manner designed to delineate different vertical sections of the included, or presumed to be included, image of the vehicle,
   wherein the lateral-position detecting means calculates average brightnesses of pixels belonging to pixel columns vertically extending in the sections and having a width corresponding to one pixel or a plurality of number of pixels, and
   wherein the lateral-position detecting means calculates differences between the average brightnesses of the pixel columns and average brightnesses of adjacent pixel columns adjacent in a lateral direction, and detects the lateral position of the vehicle on the basis of absolute values of the differences.

2. The vehicle detecting system according to claim 1, wherein the lateral-position detecting means detects the lateral position of the vehicle on the basis of the sum of the absolute values of the differences of pixel columns in the sections that have the same lateral coordinate in the taken image.

3. The vehicle detecting system according to claim 1, wherein the lateral-position detecting means detects, as the lateral position of the vehicle, a position of a pixel column that provides the highest peak value, of peak values in the sum of the absolute values of the differences calculated for the sections or the sum of the absolute values of the differences of pixel columns in the sections that have the same lateral coordinate in the taken image, the peaks exceeding a predetermined threshold value, a position of a pixel column having a peak value detected closest to a previously detected lateral position of the vehicle, or a position of a pixel column having a peak value detected farthest from a center position of the vehicle.

4. The vehicle detecting system according to claim 1, wherein the lateral-position detecting means vertically divides the region into at least a lower section serving as an image portion in which a portion of the vehicle hidden by a body of the vehicle is presumed to be included, and at least one other section serving as an other image portion.

5. The vehicle detecting system according to claim 1, wherein the lateral-position detecting means vertically divides the region into at least a lower section serving as an image portion in which a portion of the vehicle hidden by a body of the vehicle is presumed to be included, an upper section serving as an image portion in which an image of a window glass is presumed to be included, and at least one other section serving as an other image portion.

6. The vehicle detecting system according to claim 1, wherein the lateral-position detecting means divides the region into a lower section and at least one other section, or into the lower section, an upper section, and at least one other section, on the basis of a vertical proportion and with the number of sections preset in accordance with a shape of the vehicle detected currently or previously.

7. The vehicle detecting system according to claim 1, wherein, when dividing the region into the sections, the lateral-position detecting means determines a vertical proportion for dividing the region and the number of sections obtained by division, on the basis of a distribution of brightnesses of pixels belonging to a pixel column extending in the vertical direction of the region and having a width equal to one pixel or a predetermined number of pixels.

8. The vehicle detecting system according to claim 1, wherein the lateral-position detecting means adopts right and left lateral positions of the vehicle detected by the lateral-position detecting means or right and left lateral positions of the vehicle detected by the vehicle detecting means or a sensor, the adopted positions providing a lateral width of the vehicle that is closer to a previously detected lateral width of the vehicle.

9. A vehicle detecting system comprising:
   image taking means for taking an image of the surroundings of a subject vehicle;
   vehicle detecting means for detecting a vehicle from the taken image as a detected vehicle and for calculating a first lateral position determination of the detected vehicle; and
   lateral-position detecting means for detecting a lateral position of the detected vehicle separately from the vehicle detection means, wherein the lateral-position detecting means vertically divides, into a plurality of sections, a region set in a portion of the taken image in which an image of the vehicle is included or is presumed to be included, and wherein the plurality of sections formed within the region are positioned in a manner designed to delineate different vertical sections of the included, or presumed to be included, image of the vehicle,
   wherein the lateral-position detecting means calculates average brightnesses of pixels belonging to pixel columns vertically extending in the sections and having a width corresponding to one pixel or a plurality of number of pixels,
   wherein the lateral-position detecting means calculates differences between the average brightnesses of the pixel columns and average brightnesses of adjacent pixel columns adjacent in a lateral direction, and determines a second lateral position determination of the detected vehicle on the basis of absolute values of the differences, and wherein the lateral-position detecting means compares the second lateral position determination to the first lateral-position determination and adopts one of the first and second lateral position determinations based on pre-established criteria.

10. The vehicle detecting system according to claim 9, wherein the lateral-position detecting means detects the lateral position of the vehicle on the basis of the sum of the absolute values of the differences of pixel columns in the sections that have the same lateral coordinate in the taken image.

11. The vehicle detecting system according to claim 9, wherein the lateral-position detecting means detects, as the second lateral position determination, a position of a pixel column that provides the highest peak value, of peak values in the sum of the absolute values of the differences calculated for the sections or the sum of the absolute values of the differences of pixel columns in the sections that have the same lateral coordinate in the taken image, the peaks exceeding a predetermined threshold value, a position of a pixel column having a peak value detected closest to a previously detected lateral position of the vehicle, or a position of a pixel column having a peak value detected farthest from a center position of the vehicle.

12. The vehicle detecting system according to claim 9, wherein the lateral-position detecting means vertically divides the region into at least a lower section serving as an image portion in which a portion of the vehicle hidden by a body of the vehicle is presumed to be included, and at least one other section serving as another image portion, and which at least one other section is positioned vertically above the lower section within the region and includes a portion of the vehicle body.

13. The vehicle detecting system according to claim 9, wherein the lateral-position detecting means vertically divides the region into at least a lower section serving as an image portion in which a portion of the vehicle hidden by a body of the vehicle is presumed to be included, an upper section serving as an image portion in which an image of a window glass of the vehicle is presumed to be included, and the vehicle detecting system is configured to carry out a comparison of brightness values independently within each of the upper and lower sections.

14. The vehicle detecting system according to claim 9, wherein the lateral-position detecting means vertically divides the region into a lower section and an upper section or a lower section, upper section and at least one other section on the basis of a vertical proportion and the number of sections is preset in accordance with a shape of the vehicle detected currently or previously.

15. The vehicle detecting system according to claim 14, wherein, when dividing the region into the number of sections, the lateral-position detecting means determines a vertical proportion for dividing the region and the number of sections obtained by division, on the basis of a distribution of brightnesses of pixels belonging to a pixel column extending in the vertical direction of the region and having a width equal to one pixel or a predetermined number of pixels.

16. The vehicle detecting system according to claim 9, wherein the lateral-position detecting means, in conjunction with comparing the second lateral position determination to the first lateral-position determination and adopting one of the first and second lateral position determinations based on pre-established criteria, is configured to adopt both right and left first lateral position determinations or right and left second lateral position determinations, and with the adopted determinations providing a lateral width of the vehicle that is closer to a previously detected lateral width of the vehicle.

17. The vehicle detection system according to claim 9, wherein the vehicle detection means is configured to determine the first lateral position determination from parallax based distance image data derived from the taken image separately from the lateral-position detecting means determination of the second position determination based on the average brightness of pixels in the taken image.

18. The vehicle detection system according to claim 9, wherein the vehicle detecting means comprises a radar and wherein the lateral-position detecting means is configured to determine the second lateral position determination separately from the vehicle detection means determination of the first lateral position determination.

19. The vehicle detection system according to claim 9, wherein the lateral-position detecting means is configured to determine a value of the average brightnesses of pixels for each respective one of the plurality of the vertically separated sections, and wherein the plurality of sections formed within the region are positioned to include at least first and second sections of the region that each extend in the horizontal direction and that are arranged in a manner such as to be adjacent in the vertical direction.

20. The vehicle detection system according to claim 1, wherein the lateral-position detecting means is configured to determine a value of the average brightnesses of pixels for each respective one of the plurality of vertically separated sections.

21. The vehicle detection system according to claim 1 wherein the plurality of sections formed within the region are positioned to include at least first and second sections of the region that each extend in the horizontal direction and that are arranged in a manner such as to be adjacent in the vertical direction.

* * * * *